United States Patent
Koike et al.

[11] Patent Number: 6,045,063
[45] Date of Patent: Apr. 4, 2000

[54] FUEL INJECTOR

[75] Inventors: Makoto Koike; Kiyomi Kawamura; Akinori Saito, all of Aichi-ken, Japan

[73] Assignee: Kabushiki Kaisha Toyota Chuo Kenkyusho, Aichi-gun, Japan

[21] Appl. No.: 09/075,924

[22] Filed: May 12, 1998

[51] Int. Cl.7 ............................ F02M 47/00; F02M 61/08
[52] U.S. Cl. ................................. 239/533.3; 239/533.12; 239/584; 239/601
[58] Field of Search ............................ 239/533.3, 533.8, 239/533.9, 533.12, 568, 601, 106, 583, 584

[56] References Cited

U.S. PATENT DOCUMENTS

| | | | |
|---|---|---|---|
| 3,559,892 | 2/1971 | De Luca | 239/601 X |
| 4,570,853 | 2/1986 | Shmied | 239/533.3 X |
| 5,163,621 | 11/1992 | Kato et al. | 239/533.3 X |
| 5,449,121 | 9/1995 | El-Darazi et al. | 239/533.3 |

FOREIGN PATENT DOCUMENTS

| | | |
|---|---|---|
| 61-118969 | 7/1986 | Japan . |
| 63-26769 | 2/1988 | Japan . |
| 3-78562 | 4/1991 | Japan . |

*Primary Examiner*—Andres Kashnikow
*Assistant Examiner*—Steven J. Ganey
*Attorney, Agent, or Firm*—Oblon, Spivak, McClelland, Maier & Neustadt, P.C.

[57] ABSTRACT

A fuel injector which is enabled to form a fuel spray efficiently and properly into a flat sector shape by improving the angle, dispersion and atomization of the spray and by optimizing the spray tip penetration. A slit-shaped nozzle outlet 4 is constructed such that its transverse walls from its inner end 9 to its outer end 10 have an included angle γ of 20 to 180 degrees, such that an angle β of 0 to 90 degrees is made between the axis of the fuel injector and the opening direction of the slit-shaped nozzle outlet 4, such that the nozzle outlet 4 is diverged outward from a plane joining the axis to the fuel injector and the inner end 9, and such that the opposite portions of the inner end 9 have a width W of 0.05 mm to 0.24 mm. By combining these constructions suitably, the fuel spray can be formed efficiently and properly into a flat sector shape thereby to improve the fuel injection characteristics.

9 Claims, 7 Drawing Sheets

FUEL INJECTOR

BACKGROUND OF THE INVENTION

1. Industrial Field of Application

The present invention relates to a fuel injector to be used for the fuel feed in an internal combustion engine or the like and, more particularly, to a fuel injector which is excellent in the fuel injection characteristics such as the angle, dispersion and atomization of a spray and which can inject and feed a fuel spray having a flat sector shape.

2. Related Art

The fuel injector, as used in the prior art for feeding the fuel to the internal combustion engine, is exemplified by a hole nozzle type or a throttle nozzle type. These fuel injectors are employed to inject and feed a conical fuel spray and are insufficient in the angle, dispersion and atomization of the spray. A variety of trials have been made to improve the insufficiencies.

For example, there is a multi-holed nozzle type fuel injector having elliptical slit-shaped nozzle outlets (as disclosed in Unexamined Published Japanese Utility Model Application No. 61-118969). However, this fuel injector does not note the width and length in the longitudinal direction of the slit-shaped nozzle outlets but is as insufficient in the angle, dispersion and atomization of the spray as those of the fuel injector of the prior art. These improvements are also required.

Figure 14:
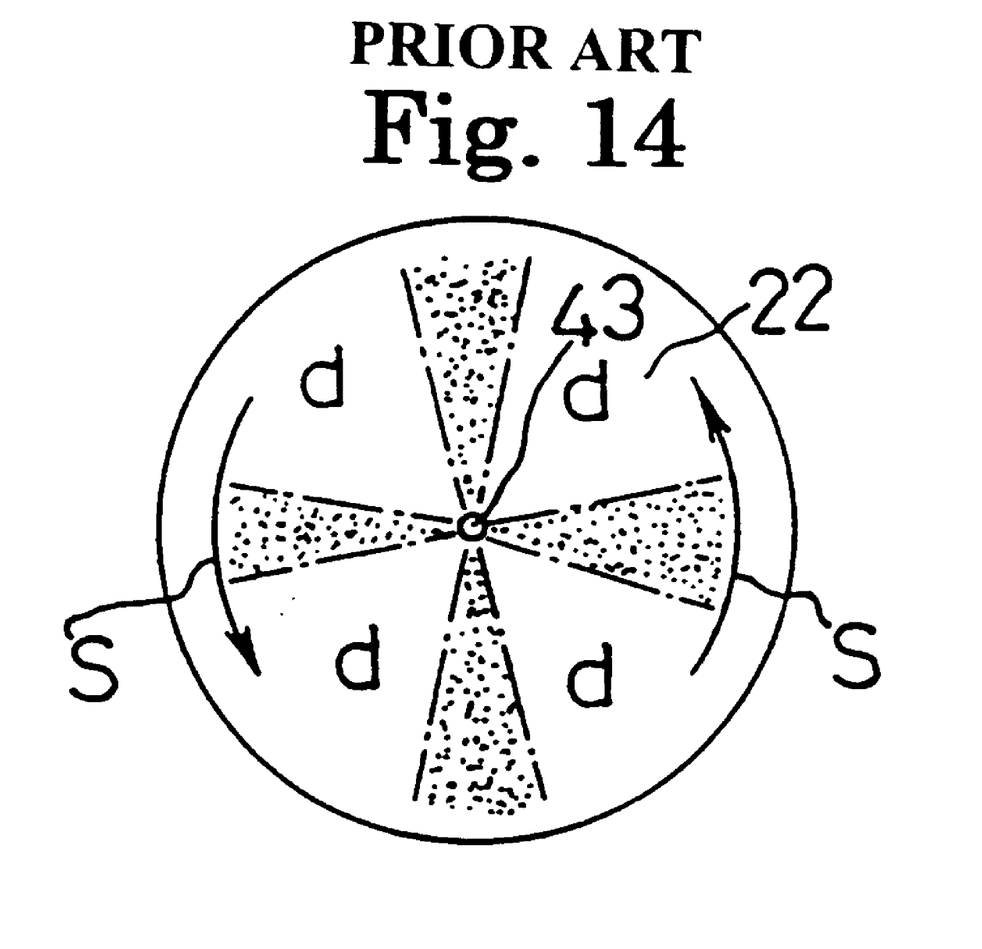
FIG. 14 is a top plan view schematically showing the spray shape of the internal combustion engine equipped with the fuel injector of the prior art.

When this fuel injector is applied to a direct injection type internal combustion engine, as shown in FIG. 14, the spray has to be dispersed by a swirl S of the intake air into the regions d in a combustion chamber 22 where the spray injected from the fuel injector is not dispersed, so that the insufficient dispersion of the spray may be compensated by the swirl S. This makes it necessary to provide a suction mechanism such as a helical port for applying the swirl S to the intake air, and this suction mechanism increases a suction resistance to lower the output. When this fuel injector is applied to an injection type internal combustion engine, moreover, the injected spray is dispersed with a thickness in the axial direction of the cylinder. This makes it necessary to deepen the combustion chamber 22 and difficult to make the combustion chamber 22 compact. In addition, because of the poor dispersion of the spray and the excessive penetration of the spray tip, much fuel sticks to the wall face of the combustion chamber to deteriorate the combustion and to increase the soot in the exhaust gas and a variety of components necessary for purifying the exhaust gas.

Next, in a spark ignition type internal combustion engine for spraying and feeding the fuel, the slit-shaped nozzle outlet is formed into an elliptical shape, and the spray is branched in two directions by a pin at the leading end of a needle (as disclosed in Unexamined Published Japanese Utility Model Application No. 63-26769). However, this slit-shaped nozzle outlet is intended to reduce the stick of the fuel to the partition of the intake pipe branches. Moreover, the spray can be branched into the two directions by the pin at the leading end of the needle, but the atomization of the spray is insufficient. Because of the intense spray tip penetration, moreover, the stick of the fuel to the inner wall faces of the intake pipe is so much as to raise such a problem to be practically solved that the diffusion and mixing of the spray into the intake flow in the intake pipe is insufficient.

In the prior art, moreover, there is a fuel injector which is constructed to have an aspect ratio of the opening of the slit-shaped nozzle outlet at 4.5 or more (as disclosed in Unexamined Published Japanese Patent Application No. 3-78562). In this fuel injector, however, the angle of divergence of the fuel spray depends upon the depth of the inner end on the side of the inner circumferential wall of the fuel injector in the slit-shaped nozzle outlet so that a predetermined spray angle cannot be efficiently and properly sufficed due to the influences of the flow resistance.

SUMMARY OF THE INVENTION

The invention contemplates to provide a fuel injector to be used for feeding a fuel to an internal combustion engine or the like and a fuel injector which is excellent in the fuel injection characteristics such as the angle, dispersion and atomization of the spray and which can inject and feed a fuel spray having a flat sector shape.

According to the invention, there is provided a fuel injector comprising: a needle valve fitted liftably in a valve bore formed in a valve member; a valve seat of said valve bore, against which the top portion of said needle valve is to abut; and a slit-shaped nozzle outlet communicating with the valve seat of said valve bore through the top portion of said needle valve and opened in the leading end of said valve member for injecting and feeding a fuel when said needle valve lifts from said valve seat, characterized: in that the opposite portions of said slit-shaped nozzle outlet in the transverse direction (corresponding to the thickness direction of the fuel injection) are diverged from the opening of said valve bore to the opening in the outer circumferential wall of said valve member; and in that the opposite portions of said slit-shaped nozzle outlet in the longitudinal direction (corresponding to the widthwise direction of the fuel injection) are made substantially parallel to each other from the opening of said valve bore to the opening in the outer circumferential wall of said valve member.

In the fuel injector of the invention, on the other hand, the diverged opposite portions of said slit-shaped nozzle outlet in the transverse direction (corresponding to the thickness direction of the fuel injection) have an included angle $\gamma$ of=20 to 180 degrees.

In the fuel injector of the invention, moreover, said slit-shaped nozzle outlet has an acute angle $\beta$ (of 0 to 90 degrees) between its opening direction and the axis of said fuel injector.

In the fuel injector of the invention, on the other hand, said slit-shaped nozzle outlet has a distance W of W=0.05 to 0.24 mm between the opposed portions of the opening on the side of said valve bore.

In the fuel injector of the invention, on the other hand, said angle $\gamma$ is set to the range of 60 to 90 degrees.

In the fuel injector of the invention, on the other hand, said distance W is set to the range of 0.06 to 0.20 mm.

In the fuel injector of the invention, moreover, said angle $\beta$ is set to the range of 0 to 60 degrees.

Here, the slit-shaped nozzle outlet includes a rectangular slot, a slot having two rounded ends and a flat elliptical slot. On the other hand, the opposite portions of the slit-shaped nozzle outlet in the transverse direction (corresponding to the thickness direction of the fuel injection) may be diverged each other from the opening of the valve bore to the opening in the outer circumferential wall side, tapered on both sides, or tapered or sloped on one side.

According to the fuel injector of the invention, the opposite portions of the slit-shaped nozzle outlet in the transverse direction (corresponding to the thickness direction of the fuel injection) are diverged from the opening of the valve bore to the opening in the outer circumferential wall of the valve member, that is, the transverse walls of the slit-shaped nozzle outlet from the inner end to the outer end of the slit-shaped nozzle outlet are diverged, and the opposite portions of the slit-shaped nozzle outlet in the longitudinal direction (corresponding to the widthwise direction of the fuel injection) are made substantially parallel from the opening of the valve bore to the opening in the outer circumferential wall of the valve member. Thus, the following effects can be actually obtained.

The fuel, as injected from the slit-shaped nozzle outlet, is stably and smoothly guided to flow along the passage which is diverted with respect to the opposed transverse walls of the diverged slit-shaped nozzle outlet so that the flow resistance to the fuel is remarkably reduced to form the liquid film of the satisfactory sector shape in the vicinity of the slit-shaped nozzle outlet.

Moreover, the flow component of the fuel to diverge in the opposed longitudinal portions, as made substantially parallel, of the slit-shaped nozzle outlet is suppressed by the substantially parallel portions to form a remarkably flat liquid film in the vicinity of the slit-shaped nozzle outlet. By this suppression, the fuel is rather guided to flow from the transverse direction (corresponding to the thickness direction of the fuel injection) to the longitudinal direction (corresponding to the widthwise direction of the fuel injection) to contribute to the formation of the sector shape so that it is formed into a remarkably satisfactory liquid film having the flat sector shape. This liquid film becomes the thinner to increase its area to contact with the surrounding air as it goes the farther from the slit-shaped nozzle outlet, so that the liquid film is abruptly torn by the surrounding air into the fine spray.

In the fuel injector of the invention, an angle $\beta$, as made between the opening direction of the slit-shaped nozzle outlet from the inner end to the outer end thereof and the axis of the fuel injector, is made acute (0 to 90 degrees), and the divergence is made outward from the plane joining the axis of the fuel injector and the inner end so that the flow direction of the fuel is not abruptly deflected to reduce the flow loss and to fail to suppress the velocity of the fuel to be injected from the slit-shaped nozzle outlet and accordingly to suppress the divergence of the liquid film in the vicinity of the slit-shaped nozzle outlet. As a result, the fuel, as injected from the slit-shaped nozzle outlet, receives the low resistance to the fuel flow like before so that it turns into the liquid film having the remarkably flat sector shape in the vicinity of the slit-shaped nozzle outlet. This liquid film becomes the thinner to increase the area to contact with the surrounding air as it goes the farther from the slit-shaped nozzle outlet, so that it is abruptly torn by the surrounding air into the fine spray.

Figure 3:
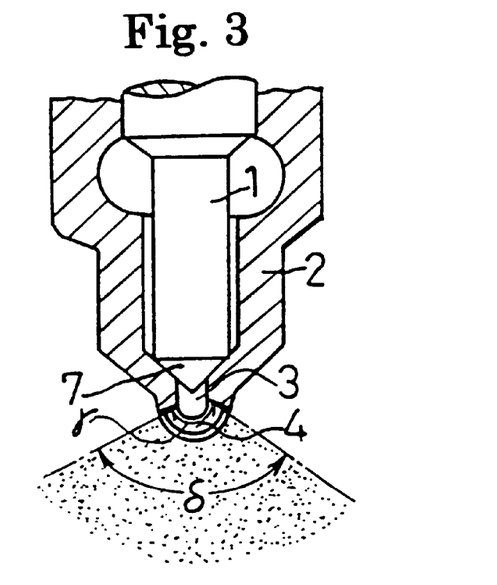
FIG. 3 is a longitudinal front selction schematically showing a spray shape in the fuel injector of the first mode of embodiment.
Figure 4:
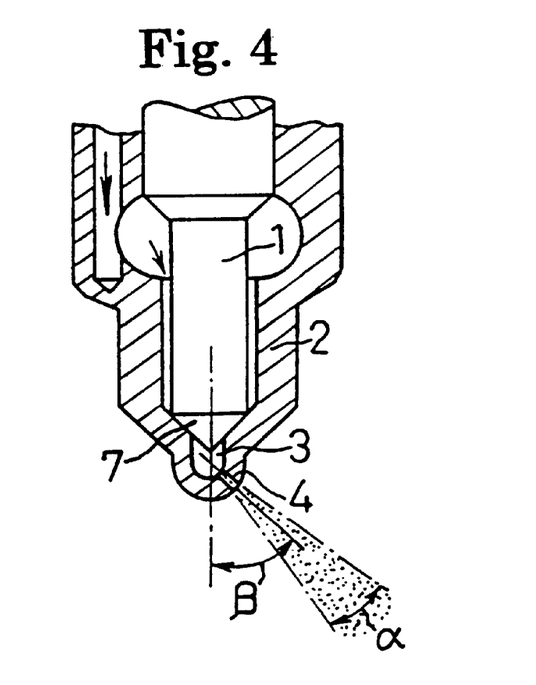
FIG. 4 is a longitudinal side section schematically showing the spray shape in the fuel injector of the first mode of embodiment.

Since the liquid film is made into the remarkably flat sector shape, moreover, the resultant spray can enlarge an angle $\delta$ of spray divergence to a desired proper value in the longitudinal direction (corresponding to the widthwise direction of the fuel injection) of the slit-shaped nozzle outlet, as shown in FIG. 3. Moreover, the spray, as injected in the transverse direction (corresponding to the thickness direction of the fuel injection) of the slit-shaped nozzle outlet, as shown in FIG. 4, is given the flat shape having a predetermined flatness angle $\alpha$ so that it is liable to entrain the surrounding air. Since the air having entrained the spray derives the spray of the momentum, moreover, the attenuation in the velocity of droplets is seriously influenced by the amount of air to be entrained by the spray, and the spray tip range and penetration are also seriously changed by the amount of air to be entrained by the spray. As a result, the angle, range penetration and so on of the spray can be selected to proper ones by making the opening angle $\beta$ acute between the opening direction of the slit-shaped nozzle outlet from the inner end to the outer end and the axis of the fuel injector and by suitably selecting the outward divergence from the plane joining the axis of the fuel injector and the inner end.

DESCRIPTION OF THE PREFERRED EMBODIMENTS

[First Mode of Embodiment]

In a fuel injector of the first mode of embodiment, as shown in FIGS. 1 to 4, a needle valve 1 is slidably fitted in a valve bore 6 which is formed in the root end face of a valve member 2, and a coil spring 5 is mounted on the root end face of the needle valve 1. At the leading end portion of the valve bore 6, there are formed a conical valve seat 8, against which a conical top portion 7 of the needle valve 1 is to abut, and a slit-shaped nozzle outlet 4 which is opened from the valve seat 8 into the leading end face of the valve member 2. A sack portion 3 is formed between the slit-shaped nozzle outlet 4 and the valve seat 8, and an annular pressure chamber 12 is formed in the valve member 2 around the boundary between the cylindrical body portion of the needle valve 1 and the conical top portion 7. A fuel feed passage 11, as formed in the root end face of the valve member 2, has communication at its leading end portion with the outer circumference of the pressure chamber 12. Between the needle valve 1 and the valve member 2, there is formed an annular communication passage 13 which has communication with the pressure chamber 12. As the pressure of a fuel to act upon the top portion 7 of the needle valve 1 via the fuel feed passage 11 and the communication passage 13, the needle valve 1 leaves the valve seat 8 of the valve bore 6 against the action of the coil spring 5. As a result, the fuel injector of the first mode of embodiment is constructed such that it is opened when the pressure chamber 12 communicates with an opening 10 through the clearance between the top portion 7 of the needle valve 1 and the valve seat 8 of the valve bore 6.

In the fuel injector of the first mode of embodiment, moreover, a passage for feeding the fuel to the slit-shaped nozzle outlet 4 at the valve opening time is formed by the fuel feed passage 11, the pressure chamber 12, the communication passage 13 and the clearance between the top portion 7 of the needle valve 1 and the valve seat 8 of the valve bore 6. The needle valve 1 can also be opened not only by the fuel pressure but also by pulling it up directly with an electromagnetic force etc. In the fuel injector of the first mode of embodiment, on the other hand, the slit-shaped nozzle outlet 4 has the outer end 10 on the outer circumferential side of the valve member 2 and the inner end 9 on the inner circumferential side of the valve member 2, namely, on the side of the sack portion 3 the outer end 10 and the inner end 9 are connected to each other through the linear or arcuate passage. The outer end 10 can be chamfered, if necessary.

Figure 1:
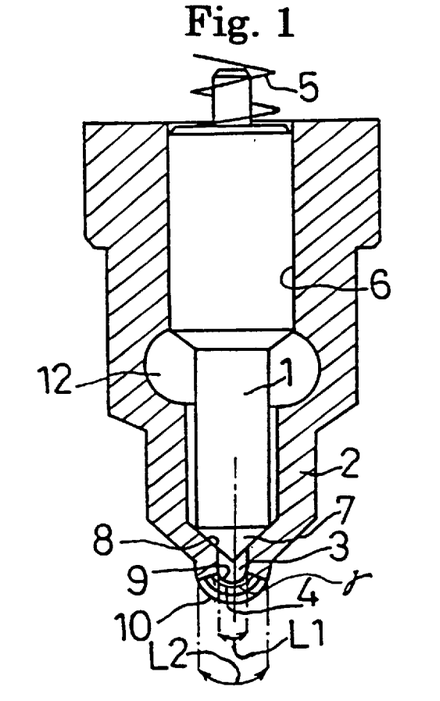
FIG. 1 is a longitudinal front section showing a fuel injector of a first mode of embodiment.
Figure 2:
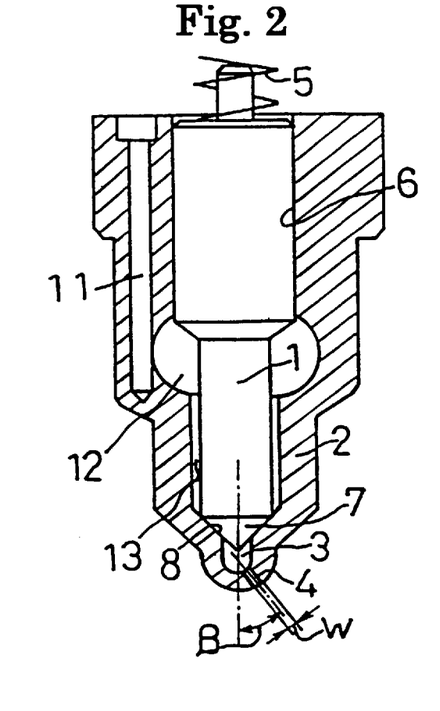
FIG. 2 is a longitudinal side section showing a fuel injector of the first mode of embodiment.

In the fuel injector of the first mode of embodiment, as shown in FIGS. 1 and 2, a length L1 of the inner end 9, as taken in the longitudinal direction, is not less than 4.5 times as large as the width W of the inner end 9. on the other hand, the length L2 of the outer end 10, as taken in the longitudinal direction, is made larger than the longitudinal length L1 of the inner end 9. Moreover, the linear or arcuate passage joining the outer end 10 and the inner end 9 is formed linear in the fuel injector of the first mode of embodiment, and diverges from the inner end 9 to the outer end 10 to have an included angle γ of 60 degrees or more between the side faces of the passage containing the aforementioned width W. This included angle γ should not be limited to 60 degrees or more but can be selected to have a range of 20 to 180 degrees.

As a result, the fuel flows on the side faces of the passage diverging from the inner end 9 to the outer end 10 so that it forms a sector-shaped liquid film diverging at an angle substantially equal to that included angle γ. Moreover, this liquid film grows the thinner as it moves the farther from the nozzle outlet 4, and is torn by the surrounding air into a fine spray. Moreover, the fuel injector of the first mode of embodiment is so characterized by the fuel to flow along the side faces of the passage diverging from the inner end 9 to the outer end 10 that it can have a self-cleaning action capable of cleaning the deposits, which are formed on the slit-shaped nozzle outlet 4, by the fuel flow injected.

Generally, deposits may be formed on the nozzle outlet of the fuel injector of the fuel injection type internal combustion engine for injecting the fuel directly into the combustion chamber. When the fuel feeding nozzle outlet is opened directly into the combustion chamber of the internal combustion engine, the temperature in the vicinity of the nozzle outlet is raised by the heat coming from the combustion flame, and the fuel slightly left in the nozzle outlet may be deteriorated, or combustion products such as soot may invade into the nozzle outlet. The deposits are formed when the combustion products are deposited on the wall face of the nozzle outlet. These deposits clog the nozzle outlet partially so that they establish a passage resistance to the fuel to make the fuel flow reluctant. This reduces the proper fuel injection rate and changes the shape of the fuel spray. These changes exert many adverse influences upon the combustion state of the internal combustion engine. Specifically, the reduction in the fuel injection rate disables the proper fuel to be fed so that the output of the internal combustion engine drops to make a proper drive difficult. On the other hand, the change in the shape of the fuel spray results in the change in the state of the mixture in the combustion chamber to make it difficult for the proper flame to propagate so that the output of the internal combustion engine drops to make a proper drive difficult. Therefore, the structure for avoiding the formation of deposits is an important requirement for the fuel injector.

On the other hand, the fuel injector of the first mode of embodiment is constructed such that the fuel flows along the side faces of the passage diverging from the inner end 9 to the outer end 10, as described hereinbefore. As a result, the deposits to be formed on the slit-shaped nozzle outlet 4 can be excluded efficiently and properly by the energy of the injected fuel, whereby the self-cleaning function can be surely made. What is more important for the fuel injector of the first mode of embodiment is a drop in the temperature in the vicinity of the slit-shaped nozzle outlet 4, because the entirety of the slit-shaped nozzle outlet 4 is cooled by the fuel flow. In the fuel injector of the prior art, as described hereinbefore, the temperature in the vicinity of the nozzle outlet 4 is raised by the heat coming from the combustion flame so that the fuel left after the fuel injection is deteriorated to form the deposits. However, the fuel injector of the first mode of embodiment exhibits the effect to prevent the deterioration of the fuel, even if left after the fuel injection, thereby to suppress the formation of the deposits essentially, because the temperature in the vicinity of the slit-shaped nozzle outlet 4 is lowered by making use of the aforementioned cooling effect of the fuel.

In the fuel injector of the first mode of embodiment, as described hereinbefore, there is formed the passage which diverges in the slit-shaped nozzle outlet 4 from the inner end 9 to the outer end 10, and the opposite distance W of the opening is set to the value of 0.05 to 0.24 mm, so that the fuel to flow can be diverged entirely of the slit-shaped nozzle outlet 4 to lower the temperature of the vicinity of the slit-shaped nozzle outlet 4 by making use of the cooling effect of the fuel thereby to suppress the formation of the deposits. Even if the deposits are formed in a small quantity, there can be realized a remarkably effective action to exclude the deposits by the force of the injection of the fuel to flow throughout of the slit-shaped nozzle outlet 4.

Here, the fuel injector of the first mode of embodiment has the following numerical range for the width (i.e., the opposite distance) W of the inner end 9 of the slit-shaped nozzle outlet 4.

Figure 8:
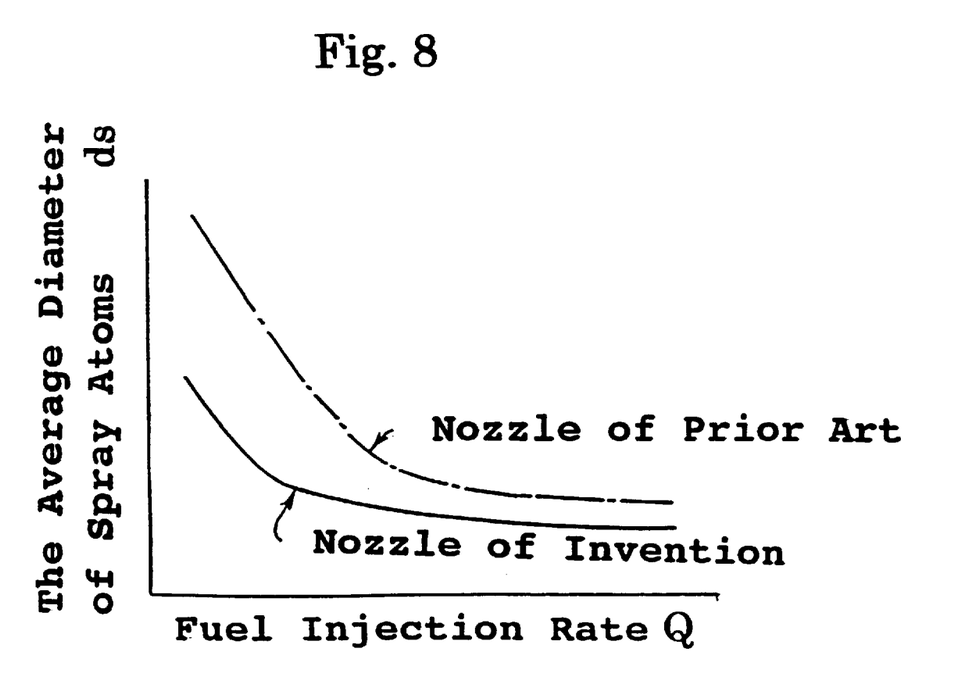
FIG. 8 is a diagram illustrating the relations between the injection rates and the average diameters of spray atoms through the fuel injector of the first mode of embodiment and through the fuel injector of the prior art.
Figure 9:
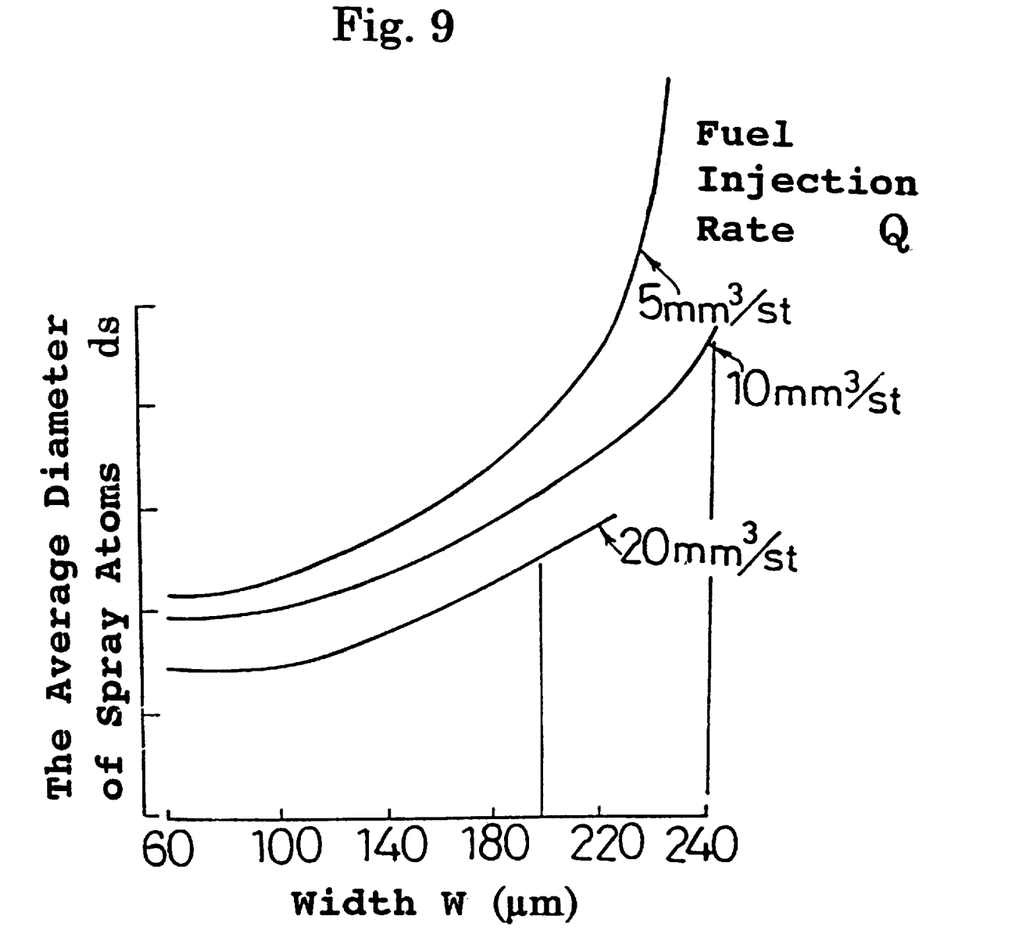
FIG. 9 is a diagram illustrating the relations between the width of the inner end and the average diameter of spray atoms through the fuel injector of the first mode embodiment.

The range of the width (i.e., the opposite distance) W of the inner end 9 in the slit-shaped nozzle outlet 4 is 0.05 mm or more and 0.24 mm or less. The optimum numerical range is 0.06 mm or more and 0.20 mm or less. As a result, in the fuel injector of the first mode of embodiment, the fuel, as injected from the slit-shaped nozzle outlet 4, takes a flat sector shape without fail, and this liquid film grows the thinner to increase its area to contact with the surrounding air as it goes the farther from the slit-shaped nozzle outlet 4, so that the liquid film is quickly torn by the surrounding air into the fine spray. The relations between the average spray diameter ds and the width W of the spray thus formed are illustrated in FIG. 9. As apparent from FIG. 9, the average spray diameter ds becomes the larger for the larger width W. This is because the liquid fuel film injected becomes the thicker for the larger width W. FIGS. 8 and 9 present the results which are obtained from the numerous experiments and so on, and it is apparent from FIG. 9 that the average spray diameter ds abruptly becomes large when the width W exceeds 0.24 mm. Moreover, the width W for the average spray diameter ds to be kept at a substantially equal value is from 0.06 mm to 0.20 mm.

In the fuel injector of the first mode of embodiment, moreover, an angle β, as made between the opening direction of the slit-shaped nozzle outlet 4 from the inner end 9 to the outer end 10 and the axis of the fuel injector is made acute. In the fuel injector of the first mode of embodiment, moreover, the longitudinal wall portion of the slit-shaped nozzle outlet 4 from the inner end 9 to the outer end 10 is diverged outward from the plane joining the axis thereof and the inner end 9.

In the fuel injector of the first mode of embodiment, the angle β of the opening direction of the slit-shaped nozzle outlet 4 with respect to the axis of the fuel injector has the following numerical range.

Specifically, the angle β, as made between the slit-shaped nozzle outlet 4 shown in FIG. 2 and the center axis of the fuel injector, is desired to be 0 degrees (or coaxial) or more and less than 90 degrees. Moreover, the optimum numerical value is 0 degrees (or coaxial) or more and less than 60 degrees. This is because, if the angle β exceeds 90 degrees when the fuel injected by the lift of the needle valve 1 flows through the clearance between the valve seat 8 of the valve bore 6 and the top portion 7 of the needle valve 1 and reaches the slit-shaped nozzle outlet 4, the flow direction is abruptly deflected to increase the flow loss. As a result, the velocity of the fuel to be injected from the slit-shaped nozzle outlet 4 is suppressed to suppress the divergence of the liquid film which might otherwise be formed into the flat sector shape in the vicinity of the slit-shaped nozzle outlet 4. Thus, the liquid film having the flat sector shape becomes the thinner to increase its area to contact with the surrounding air as its goes the farther from the slit-shaped nozzle outlet 4, thereby to eliminate the effect that the liquid film is abruptly torn by the surrounding air into the fine spray.

[Actions/Effects of First Mode of Embodiment]

In the fuel injector thus constructed according to the first mode of embodiment, the opposite portions of the slit-shaped nozzle outlet 4 in the transverse direction (corresponding to the thickness direction of the fuel injection) are diverged from the opening of the valve bore 6 to the opening in the outer circumferential wall of the valve member 2, that is, the transverse walls of the slit-shaped nozzle outlet 4 from the inner end 9 to the outer end 10 of the slit-shaped nozzle outlet 4 are diverged, and the opposite portions of the slit-shaped nozzle outlet 4 in the longitudinal direction (corresponding to the widthwise direction of the fuel injection) are made substantially parallel from the opening of the valve bore 6 to the opening in the outer circumferential wall of the valve member 2. Thus, the following effects can be actually obtained.

The fuel, as injected from the slit-shaped nozzle outlet 4, is stably and smoothly guided to flow along the passage which is diverted with respect to the opposed transverse walls of the diverged slit-shaped nozzle outlet 4 so that the flow resistance to the fuel is remarkably reduced to form the liquid film of the satisfactory sector shape in the vicinity of the slit-shaped nozzle outlet 4. Moreover, the flow component of the fuel to diverge in the opposed longitudinal portions, as made substantially parallel, of the slit-shaped nozzle outlet 4 is suppressed by the substantially parallel portions to form a remarkably flat liquid film in the vicinity of the slit-shaped nozzle outlet 4.

By this suppression, the fuel is rather guided to flow from the transverse direction (corresponding to the thickness direction of the fuel injection) to the longitudinal direction (corresponding to the widthwise direction of the fuel injection) to contribute to the formation of the sector shape so that it is formed into a remarkably satisfactory liquid film having the flat sector shape. This liquid film becomes the thinner to increase its area to contact with the surrounding air as its goes the farther from the slit-shaped nozzle outlet 4, so that the liquid film is abruptly torn by the surrounding air into the fine spray.

In the fuel injector thus constructed according to the first mode of embodiment, moreover, the angle β, as made between the opening direction of the slit-shaped nozzle outlet 4 from the inner end 9 to the outer end 10 thereof and the axis of the fuel injector, is made acute, and the divergence is made outward from the plane joining the axis of the fuel injector and the inner end 9. As a result, the fuel, as injected from the slit-shaped nozzle outlet 4, receives the low flow resistance so that it turns into the liquid film having the remarkably flat sector shape in the vicinity of the slit-shaped nozzle outlet 4. This liquid film becomes the thinner to increase the area to contact with the surrounding air as it goes the farther from the slit-shaped nozzle outlet 4, so that it is abruptly torn by the surrounding air into the fine spray thereby to promote the atomization of the spray, as shown in FIGS. 8 and 9.

Since the liquid film is made into the remarkably flat sector shape, moreover, the resultant spray can enlarge an angle of spray divergence to a desired proper value in the longitudinal direction (corresponding to the widthwise direction of the fuel injection) of the slit-shaped nozzle outlet 4, as shown in FIG. 3. As shown in FIGS. 3 and 4, moreover, the spray, as injected in the transverse direction (corresponding to the thickness direction of the fuel injection) of the slit-shaped nozzle outlet 4, is given the flat shape having a predetermined flatness angle α so that it is liable to entrain the surrounding air. Since the air having entrained the spray derives the spray of the momentum, moreover, the attenuation in the velocity of droplets is seriously influenced by the amount of air to be entrained by the spray, and the spray tip range and penetration are also seriously changed by the amount of air to be entrained by the spray. As a result, the angle, range penetration and so on of the spray can be selected to proper ones by making the opening angle β acute of the longitudinal walls of the slit-shaped nozzle outlet 4 from the inner end 9 to the outer end 10 with respect to the axis of the fuel injector and by suitably selecting the outward divergence from the plane joining the axis of the fuel injector and the inner end.

[Second Mode of Embodiment]

Figure 5:
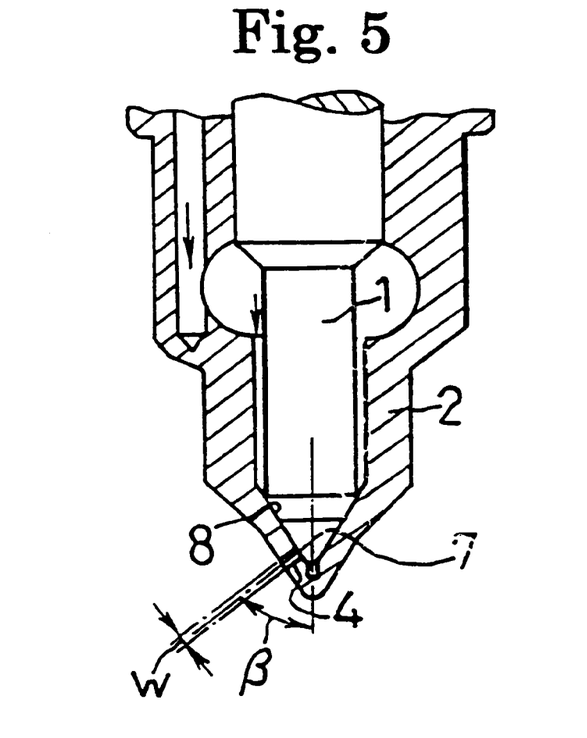
FIG. 5 is a longitudinal side section showing a fuel injector of a second mode of embodiment.

In the fuel injector constructed according to the second mode of embodiment, as shown in FIG. 5, the slit-shaped nozzle outlet 4 is formed in the vicinity of the valve seat 8, and the leading end face of the valve member 2 from the valve seat 8 is converged to reduce its volume thereby to omit the sack portion 3.

In the fuel injector thus constructed according to the second mode of embodiment, the mixing between the atomized fuel and the air can be promoted while dispersing the injected fuel widely by the slit-shaped nozzle outlet 4, by injecting the fuel from the slit-shaped nozzle outlet 4. Moreover, the fuel injector of the second mode of embodiment achieves a more practically excellent effect in the retention of the fuel flow rate, the fuel-out-off and so on than that of the foregoing mode of embodiment.

[Application]

Figure 6:
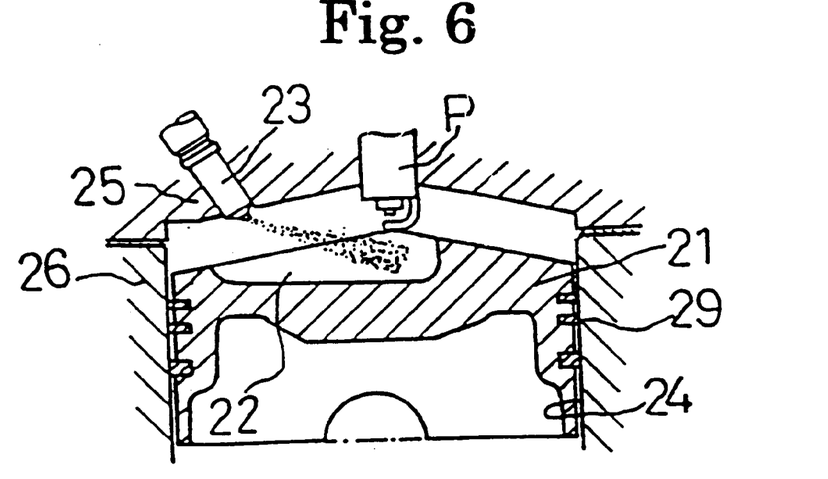
FIG. 6 is a longitudinal side section showing an internal combustion engine to which the fuel injector of the first mode of embodiment is applied.
Figure 7:
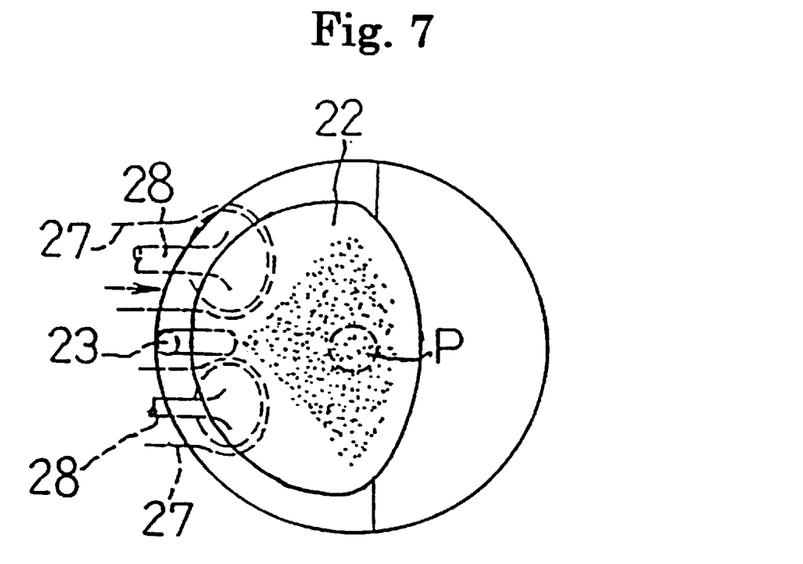
FIG. 7 is a top plan view showing the internal combustion engine to which the fuel injector of the first mode of embodiment is applied.

FIGS. 6 and 7 show an applied example in which the fuel injector of the first mode of embodiment is applied to a four-valve type direct fuel injection internal combustion engine. The fuel injector of the first mode of embodiment is so arranged in a cylinder head 25 which is provided with intake ports 27 establishing no suction swirl and intake valves 28, and exhaust ports and exhaust valves (although not individually shown), that its slit-shaped nozzle outlet 4 faces a combustion chamber 22. In a cylinder 24 mounted in a cylinder block 26, there is reciprocally fitted a piston 21. This piston 21 is equipped on its side face with a plurality of piston rings 29 for preventing the blow-by gas from the combustion chamber 22. On the other hand, the piston 21 is given a diameter of 70 to 100 mm and is provided, in its upper face on the intake valve side, with the shallow cavity 22 having a depth of several mm to several tens mm so as to disperse the fuel spray homogeneously. The fuel injector 23 injects the fuel spray having a horizontally flat sector shape in the direction, as shown in FIG. 7, from the fuel injector 23 to an ignition plug P. As the fuel is injected from the fuel injector 23 at the second half of the compression stroke of the piston 21, the fuel spray is diverged in the flat sector shape to the cavity 22.

At this time, in the fuel injector of the first mode of embodiment, the opening angle of the slit-shaped nozzle outlet 4 can be selected at 0 degrees (or coaxial) or more and less than 90 degrees (i.e., with an optimum numerical range of 0 degrees (or coaxial) or more and less than 60 degrees), so that the direction of the sector-shaped fuel spray toward the ignition plug P can be determined to the optimum for ensuring the ignition and combustion. If this direction is improper, the fuel spray may pass a position apart from the ignition plug P and may fail to be ignited, or may impinge directly upon the ignition plug P to wet the ignition plug P and may fail to be properly ignited.

In the fuel injector of the first mode of embodiment, on the other hand, the width W of the inner end 9 of the slit-shaped nozzle outlet 4 is selected to 0.05 mm or more and 0.24 mm or less so that the fuel injected from the nozzle outlet 4 is formed into the flat sector shape to establish the proper fuel distribution in the cavity 22 while retaining the satisfactory atomized state. As a result, the fuel in the cavity 22 is abruptly evaporated and mixed with the air. Moreover, the proper mixture distribution is established in the cavity 22. As a result, the mixture, as ignited by the ignition plug P, is quickly burned to realize a complete combustion of a high efficiency. Thus, the fuel injection type internal combustion engine, to which the fuel injector of the first mode of embodiment is applied, enjoys a high efficiency and exhausts little noxious emission.

In the internal combustion engine of the applied example of the present application, moreover, the fed fuel is sufficiently dispersed to require no intense suction swirl, but the air using efficiency is drastically raised without any suction swirl, and the fuel spray has a proper penetration. As a result, no fuel sticks to the wall face of the combustion chamber 22 before it is ignited, to realize the combustion promptly.

In the internal combustion engine to which an air flow such as the suction swirl is added, the air to be sucked has to be drifted. Therefore, the intake pipe may be given a special shape, partially constricted or provided with a throttle valve. However, these provisions raise the intake resistance to lower the flow rate of air into the internal combustion engine. As a result, the internal combustion engine has to increase its displacement and accordingly its volume and weight.

In the internal combustion engine to which the fuel injector of the first mode of embodiment is applied, no intense suction swirl is required so that the intake pipe requires no special construction. As a result, the intake resistance is minimized to invite no drop in the maximum output of the internal combustion engine. In the internal combustion engine to which the fuel injector of the first mode of embodiment is applied, therefore, the internal combustion engine itself can be given a small and light construction. On the other hand, the internal combustion engine of the present application is of the spark ignition type, and should not be limited thereto but can be modified into a compression ignition type internal combustion engine. In this modification, no ignition plug P has to be attached to the cylinder head.

On the other hand, the slit-shaped nozzle outlet should not be limited to the aforementioned single hole but can be modified into multiple holes, as shown in FIGS. 10 to 13.

[First Embodiment]

Figure 10:
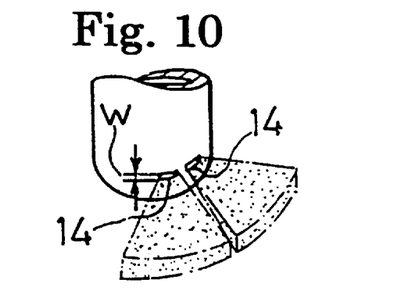
FIG. 10 is a perspective view showing an essential portion of a fuel injector of a first embodiment of the invention.

In a common plane around the axis of the fuel injector, as shown in FIG. 10, there are formed a plurality of slit-shaped nozzle outlets 14 which have no intersection in their opening directions so that they can spray the fuel dispersedly to inject and feed the fuel over a wide area of the combustion chamber.

[Second Embodiment]

Figure 11:
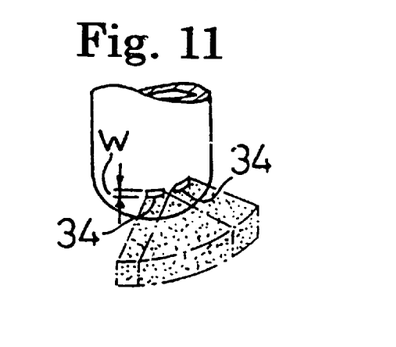
FIG. 11 is a perspective view showing an essential portion of a fuel injector of a second embodiment.

In a common plane around the axis of the fuel injector, as shown in FIG. 11, there are formed a plurality of slit-shaped nozzle outlets 34 which have an intersection in their opening directions so that they can spray the fuel composedly to inject and feed the fuel concentratedly at a local position of the combustion chamber.

[Third Embodiment]

Figure 12:
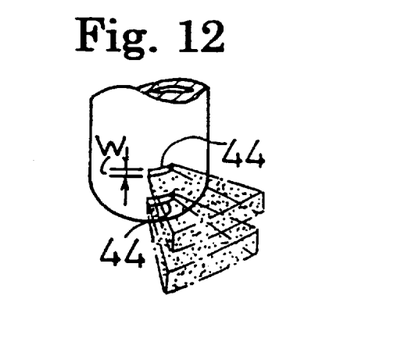
FIG. 12 is a perspective view showing an essential portion of a fuel injector of a third embodiment.

In the axial direction and in a generally common plane of the fuel injector, as shown in FIG. 12, there are formed a plurality of slit-shaped nozzle outlets 44 which are arranged in multiple steps so that they can spray the fuel in layers to inject and feed the fuel over a wide area of the combustion chamber. In this embodiment, the slit-shaped nozzle outlets 44 can be so controlled according to the lift of the needle valve as to inject and feed the fuel from only the lower step, when the lift is small, but from both the upper and lower steps when the lift is large.

[Fourth Embodiment]

Figure 13:
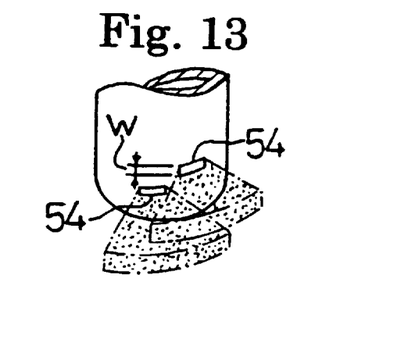
FIG. 13 is a perspective view showing an essential portion of a fuel injector of a fourth embodiment.

In different planes around the axis and in axially different planes of the fuel injector, as shown in FIG. 13, there are formed a plurality of slit-shaped nozzle outlets 54 for spray the fuel dispersedly independently of one another to inject and feed it over a wide area of the combustion chamber and in a laminar form.

We claim:

1. A fuel injector comprising:
   a needle valve fitted liftably in a valve bore formed in a valve member;
   a valve seat of said valve bore, against which a top portion of said needle valve is to abut; and
   a slit-shaped nozzle outlet communicating with the valve seat of said valve bore through the top portion of said needle valve and opened in a leading end of said valve member for injecting and feeding a fuel when said needle valve lifts from said valve seat, wherein:

opposite portions of said slit-shaped nozzle outlet in a transverse direction (corresponding to the thickness direction of fuel injection) are diverged from each other from an opening of said valve bore to an opening in an outer circumferential wall of said valve member, opposite portions of said slit-shaped nozzle outlet in a longitudinal direction (corresponding to the widthwise direction of fuel injection) are made substantially parallel to each other from the opening of said valve bore to the opening in the outer circumferential wall of said valve member, and said slit-shaped nozzle outlet has a distance W of 0.05 to 0.24 mm between the opposite portions of the opening on a side of said valve bore.

2. A fuel injector as defined in claim 1, wherein said distance W is set to the range of 0.06 to 0.20 mm.

3. A fuel injector as defined in claim 2, wherein the diverged opposite portions of said slit-shaped nozzle outlet in the transverse direction have an inclined angle $\gamma$ of 20 to 180 degrees.

4. A fuel injector as defined in claim 3, wherein said slit-shaped nozzle outlet has an acute angle $\beta$ of 0 to 60 degrees between an opening direction of said slit-shaped nozzle outlet and a longitudinal axis of said fuel injector.

5. A fuel injector as defined in claim 1, wherein the diverged opposite portions of said slit-shaped nozzle outlet in the transverse direction have an included angle $\gamma$ of 20 to 180 degrees.

6. A fuel injector as defined in claim 5, wherein said slit-shaped nozzle outlet has an acute angle $\beta$ of 0 to 60 degrees between an opening direction of said slit-shaped nozzle outlet and a longitudinal axis of said fuel injector.

7. A fuel injector as defined in claim 1, wherein said diverged opposite portions of said slit-shaped nozzle outlet in the transverse direction have an included angle $\gamma$ of 60 to 90 degrees.

8. A fuel injector comprising:

a needle valve fitted liftably in a valve bore formed in a valve member;

a valve seat of said valve bore, against which a top portion of said needle valve is to abut; and a slit-shaped nozzle outlet communicating with the valve seat of said valve bore through the top portion of said needle valve and opened in a leading end of said valve member for injecting and feeding a fuel when said needle valve lifts from said valve seat, wherein:

opposite portions of said slit-shaped nozzle outlet in a transverse direction (corresponding to the thickness direction of fuel injection) are diverged from each other from an opening of said valve bore to an opening in an outer circumferential wall of said valve member, opposite portions of said slit-shaped nozzle outlet in a longitudinal direction (corresponding to the widthwise direction of fuel injection) are made substantially parallel to each other from the opening of said valve bore to the opening in the outer circumferential wall of said valve member, and said diverged opposite portions of said slit-shaped nozzle outlet in the transverse direction have an included angle $\gamma$ of 60 to 90 degrees.

9. A fuel injector as defined in claim 8, wherein said slit-shaped nozzle outlet has an acute angle $\beta$ of 0 to 90 degrees between an opening direction of said slit-shaped nozzle outlet and a longitudinal axis of said fuel injector.

* * * * *

UNITED STATES PATENT AND TRADEMARK OFFICE
CERTIFICATE OF CORRECTION

PATENT NO. : 6,045,063
DATED : April 4, 2000
INVENTOR(S) : Makoto Koike et al.

It is certified that error appears in the above-identified patent and that said Letters Patent is hereby corrected as shown below:

On the title page, item [54], and at the top of Column 1, the Title is incorrect. Item [54] should read as follows:

--[54] FUEL INJECTION VALVE AND NOZZLE--

Also,

On the title page, Item [75], the Inventors' residency is incorrect. Item [75] should read as follows:

---[75] Inventors: Makoto Koike; Kiyomi Kawamura; Akinori Saito, all of Aichi-gun, Japan---

Signed and Sealed this

Twelfth Day of June, 2001

*Attest:*

*Attesting Officer*

NICHOLAS P. GODICI
*Acting Director of the United States Patent and Trademark Office*